(12) United States Patent
Ageishi et al.

(10) Patent No.: US 6,439,552 B1
(45) Date of Patent: Aug. 27, 2002

(54) OVERHEAD WIRE TENSIONING DEVICE

(75) Inventors: Satoshi Ageishi; Hiroshi Amano; Yoshio Narumiya; Toru Uchikoshi, all of Nagoya; Shoji Konta; Yoshinori Wakabayashi, both of Higashiosaka; Takeyoshi Shinbori; Takeshi Uchida, both of Yokohama, all of (JP)

(73) Assignees: Central Japan Railway Company; Dengyo Incorporated; NHK Spring Co., Ltd., all of (JP)

( * ) Notice: Subject to any disclaimer, the term of this patent is extended or adjusted under 35 U.S.C. 154(b) by 0 days.

(21) Appl. No.: 09/423,205

(22) PCT Filed: Sep. 11, 1997

(86) PCT No.: PCT/IB97/01147

§ 371 (c)(1),
(2), (4) Date: Nov. 3, 1999

(87) PCT Pub. No.: WO99/12762

PCT Pub. Date: Mar. 18, 1999

(51) Int. Cl.[7] .................................................. F16F 5/00
(52) U.S. Cl. ........................ 267/122; 188/379; 267/73
(58) Field of Search ........................... 267/113, 74, 69, 267/73, 122, 64.19, 64.27; 188/269, 379, 196 R, 197, 198, 380

(56) References Cited

U.S. PATENT DOCUMENTS

| 2,837,175 | A | * | 6/1958 | Schweitzer ................... 188/379 |
| 4,378,713 | A | * | 4/1983 | Haskell et al. ........ 188/196 R X |
| 4,403,877 | A | * | 9/1983 | Jones et al. .............. 188/380 X |
| 4,682,760 | A | * | 7/1987 | Baumgarten ............... 267/74 X |
| 5,098,071 | A | * | 3/1992 | Umetsu .................... 267/64.27 |

FOREIGN PATENT DOCUMENTS

| JP | 50-22240 | 7/1975 |
| JP | 59-20206 | 5/1981 |

* cited by examiner

*Primary Examiner*—Robert J Oberleitner
*Assistant Examiner*—Melanie Torres
(74) *Attorney, Agent, or Firm*—Skjerven Morrill MacPherson LLP (57) ABSTRACT

The overhead wire tensioning device of the present invention is improved in reliability and eliminates the need for constant maintenance work by protecting the slide mechanism between the cylinder case of the gas spring type overhead wire tensioning device and the cylinder rod, and the pivoting mechanism for the connecting rod connecting this cylinder with the overhead wire from external influences.

7 Claims, 7 Drawing Sheets

OVERHEAD WIRE TENSIONING DEVICE

TECHNICAL FIELD

The present invention relates to an overhead wire tensioning device that can be used for such applications as maintaining a tension of overhead wire for railways.

BACKGROUND OF THE INVENTION

Overhead wire, in particular overhead wire for railways (such as main wire, support wire and trolley lines), is required to be tensioned appropriately at all times because the tension of the overhead wire is affected by such factors as the elongation and shrinking due to temperature changes, elongation due to creeping and wear of the material of the wire, and the tilting of the supporting structures over time. It is particularly desirable to be able to automatically adjust the tension of the overhead wire, and eliminate the need for maintenance work.

Conventionally known automatic tensioning devices for maintaining the tension of overhead wire at a constant level include those using pulleys to produce a tension from the gravitational force acting on a weight, and those using springs to produce a tension from the spring force of a spring. The pulley type can provide a favorable performance in maintaining the tension at a constant level, but the work involved in installation is significant and a regular maintenance work is required to prevent degradation of the wire. Tensioning devices using gas springs (such as those disclosed in Japanese patent laid open publication No. 6-16068) have drawn attention in this regard as they allow the entire assembly to be highly compact and light-weight, and eliminate the need for constant maintenance work.

A gas spring type tensioning device of this type includes a cylinder case defining a gas chamber and having one end of the device attached to one of a fixed end and the overhead wire, and a cylinder rod extending out of the cylinder case and having an end attached to the other of the fixed end and the overhead wire. As the cylinder rod and the cylinder case is required to be axially slidable relative to each other, if the mechanism for permitting this relative sliding movement fails to operate properly, the sliding resistance between them could increase to such an extent that a desired tension may not be achieved. Therefore, it has been desired to improve the device so as to eliminate such a possibility.

A gas spring type tensioning device of this type additionally includes a tension rod extending between the cylinder and the overhead wire and having an end pivotally attached to the cylinder via a trunnion shaft to accommodate the swaying movement of the overhead wire. If such a pivotable arrangement fails, this tension rod mechanism becomes unable to accommodate the swaying movement of the overhead wire, and this likewise may prevent maintenance of a desired tension.

In view of such problems of the prior art, a primary object of the present invention is to provide an overhead wire tensioning device which can favorably maintain a tension of overhead wire at a constant level, and is highly reliable in use without requiring any constant maintenance work.

Other features and advantages of the present invention will be described in the following with reference to the appended drawings.

BEST MODE OF CARRYING OUT THE INVENTION

Now a preferred embodiment of the present invention is described in the following with reference to the appended drawings.

Figure 1:
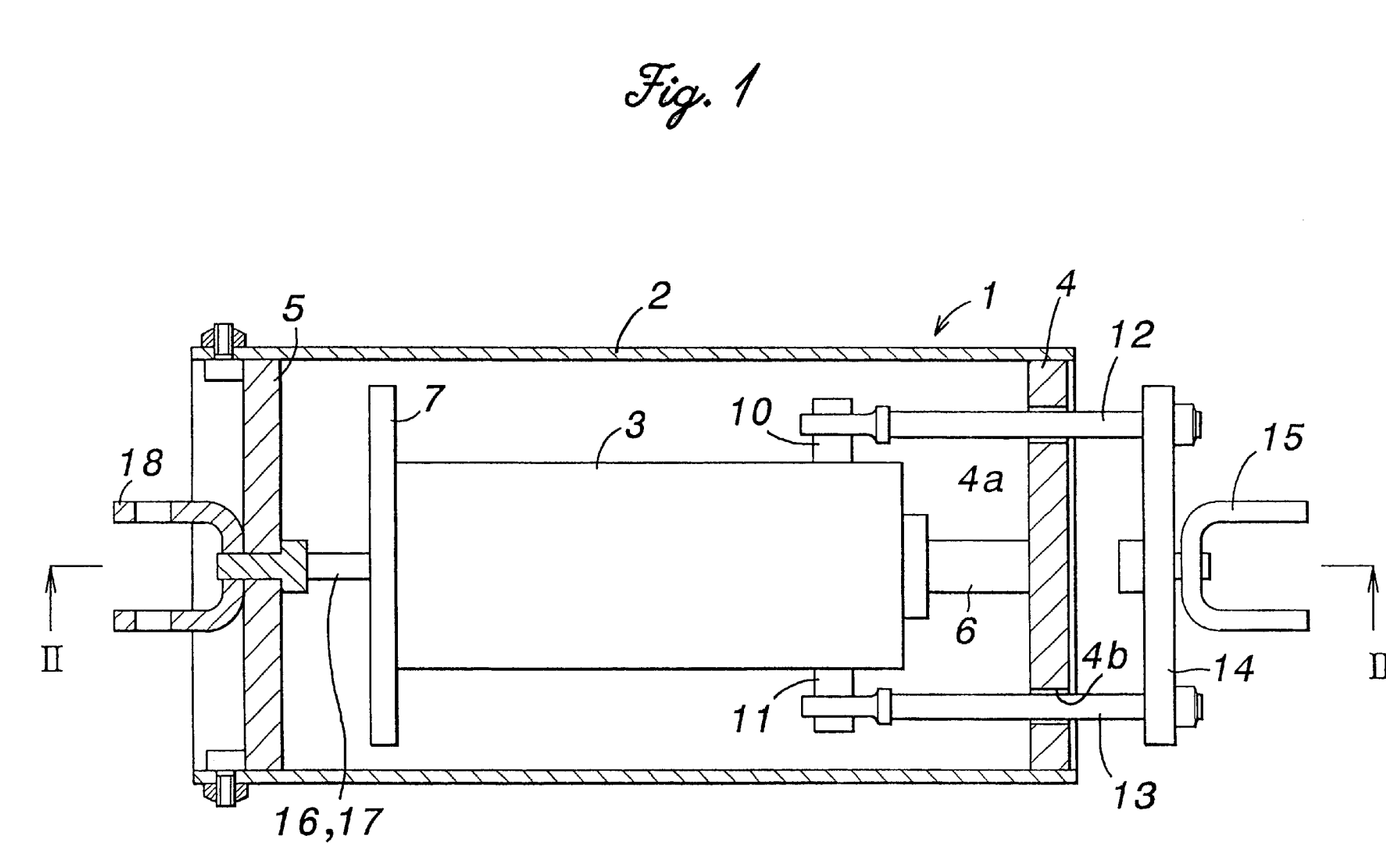
FIG. 1 is a plan view of a tensioning device embodying the present invention.
Figure 2:
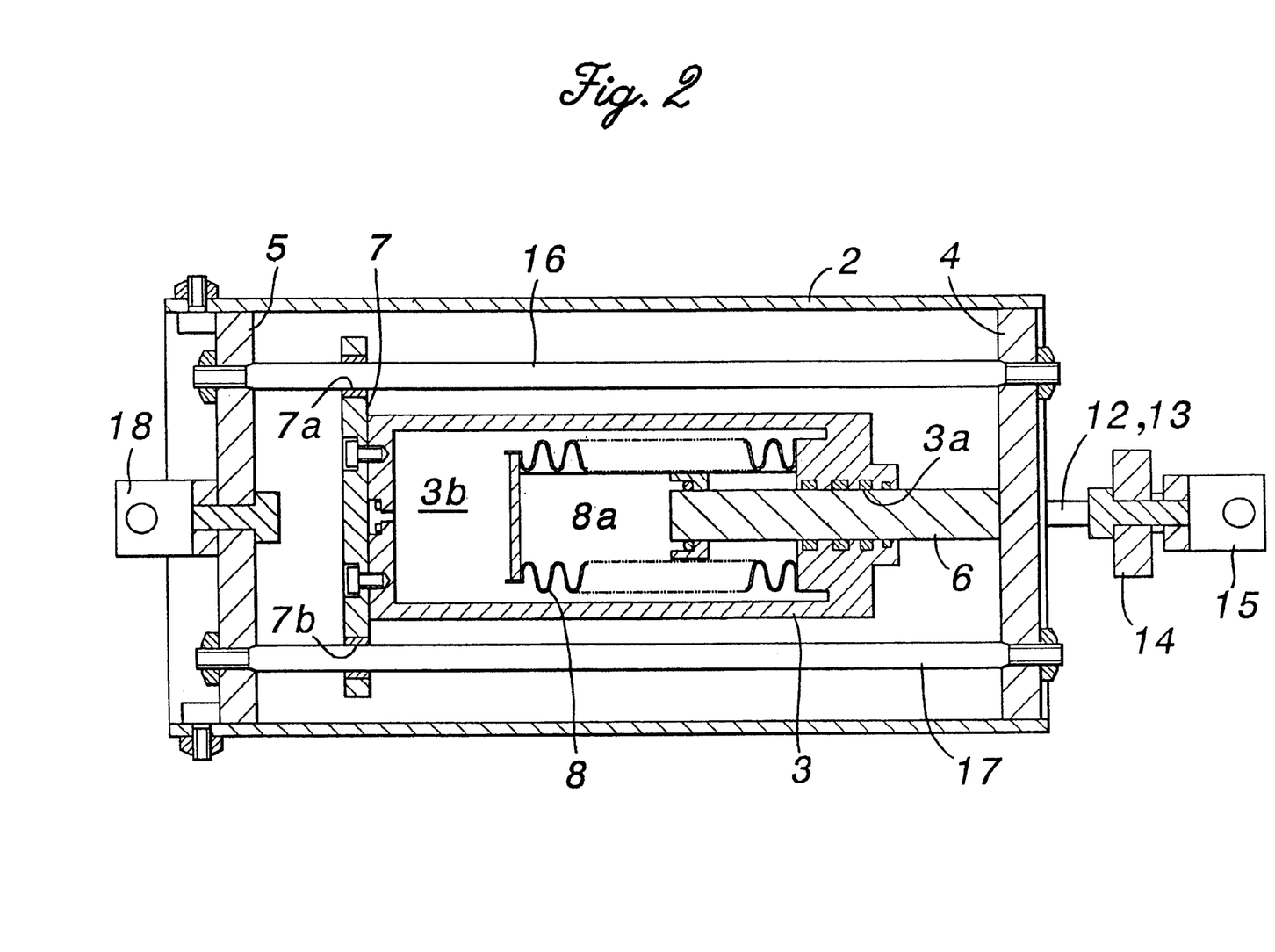
FIG. 2 is a sectional view taken along line II—II of FIG. 1.
Figure 3:
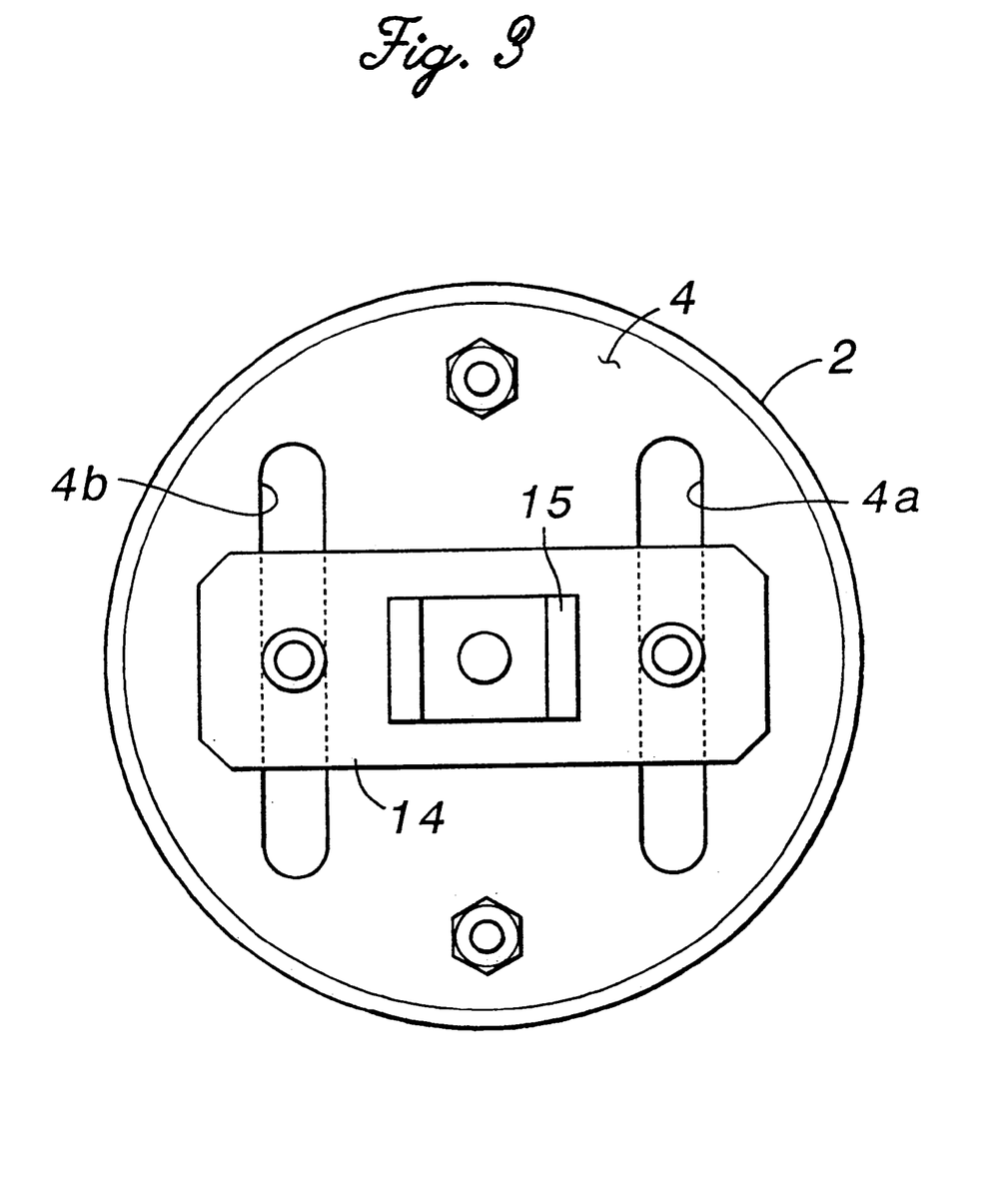
FIG. 3 is a plan view as seen from a right end of FIG. 1.

FIG. 1 is a plan view of a tensioning device embodying the present invention, FIG. 2 is a sectional view taken along line II—II of FIG. 1, and FIG. 3 is a plan view as seen from a right end of FIG. 1. This tensioning device 1 comprises an outer casing 2 having a cylindrical shape with a closed bottom end, a hollow cylinder case 3 received in the outer casing 2, and a cylinder rod 6 having an end fixedly attached to a bottom portion 4 of the outer casing 1 on the right end thereof, and another end passed into the cylinder case 3 via a through hole 3a. A cylinder flange 7 is attached to the other end of the cylinder case 3 with threaded bolts or the like.

As shown in FIG. 2, a gas chamber 3b is defined in the cylinder case 3, and is filled with high pressure nitrogen gas. A liquid chamber 8a filled with liquid is defined inside the gas chamber 3b by a bellows 8 which is fixedly attached to the right end of the cylinder case 3 at an end thereof, and capable of expanding and shrinking in the axial direction. The other end of the cylinder rod 6 is passed into this liquid chamber 8a.

As shown in FIGS. 1 and 3, slots 4a and 4b are formed in the bottom portion 4 of the outer casing 2 on the right end thereof. Trunnion shafts 10 and 11 are formed on either side of the cylinder case 3 at a right end portion thereof to pivotally support one ends of a pair of tension bars 12 and 13 serving as connecting rods. These tension bars 12 and 13 extend out of the outer casing 2 through the slots 4a and 4b in the right bottom portion thereof, and the other ends are connected to each other by a connecting plate 14. An overhead wire bracket 15 is provided in a central part of the connecting plate 14. This arrangement accommodates the difference in the extending direction of the overhead wire which is connected to the bracket 15 but not shown in the drawing. Furthermore, any swaying movement of the overhead wire can be accommodated by the pivoting movement of the tension bars 12 and 13 around the trunnion shafts 10 and 11 to the extent permitted by the slots 4a and 4b. The trunnion shafts 10 and 11 are located inside the outer casing 2, and are somewhat spaced away from the inner wall of the outer casing 2. Therefore, even when the outer casing 2 is dented or otherwise deformed by external influences, the pivoting movement of the tension bars 12 and 13 would not be interfered by it.

As shown in FIG. 2, a pair of guide rods 16 and 17 extend between the right bottom end portion 4 of the outer casing 2 and the left bottom end portion 5 of the outer casing 2. A guide mechanism for the cylinder case 3 is formed by passing the guide rods 16 and 17 through guide holes 7a and 7b formed in the cylinder flange 7. The left bottom end portion 5 of the outer casing 2 is firmly prevented from coming off from the outer casing 2, and is centrally provided with a pole bracket 18 for the support structure. The guide mechanism comprising these guide rods 16 and 17 and the cylinder flange 7 is somewhat separated from the inner wall of the outer casing 2. Therefore, even when the outer casing 2 is dented or otherwise deformed by external influences, the guide mechanism can maintain its function.

In the gas spring tensioning device 1 described above, the pressure of the high pressure gas in the gas chamber 3b is applied to the liquid chamber 8a via an end surface (a bellows cap or a pressure receiving surface) of the bellows 8 to actuate the bellows 8 in the direction to shrink. As this force acts in the direction to push the cylinder rod 6 out of the cylinder case, the two brackets 15 and 18 are urged toward each other.

The tension of the overhead wire acting upon the bracket 15 is transmitted to the cylinder case 3 via the tension bars 12 and 13 and the trunnion shafts 10 and 11 so as to pull the cylinder rod 6 into the cylinder case 3. Therefore, the relative position of the cylinder rod 6 is determined by the balance between the tension of the overhead wire and the gas pressure in the gas chamber 3b. When changes in the surrounding temperature causes the overhead wire to elongate and shrink, they also affect the gas in the gas chamber 3b. For instance, when a rise in the surrounding temperature elongates the overhead wire, the gas in the gas chamber 3b expands and this in turn causes to apply a tension to the overhead wire so as to cancel the elongation of the overhead wire. To maintain the tension of the overhead wire without regard to the surrounding temperature, the volume of the gas should be determined as given in the following.

$$V = AL\alpha T$$

where

A: pressure receiving area of the cylinder rod
L: length of the overhead wire
α: line expansion coefficient of the overhead wire
T: absolute temperature.

When the expansion of the oil in the liquid chamber is taken into consideration, the optimum volume of the gas will be given by the following equation.

$$V = (AL\alpha - V_{oil}\beta)T$$

where $V_{oil}$: volume of the oil
β: volume of the oil

By thus determining the pressure of the gas in the gas chamber 3b and the volume of the chamber 3b so as to match the elongation and shrinkage of the overhead wire due to the changes in the surrounding temperature with the retraction and extension of the cylinder rod 6 due to the expansion of the gas chamber 8a, it is possible to automatically keep the tension of the overhead wire at a constant level without regard to the change in the surrounding temperature.

Figure 4:
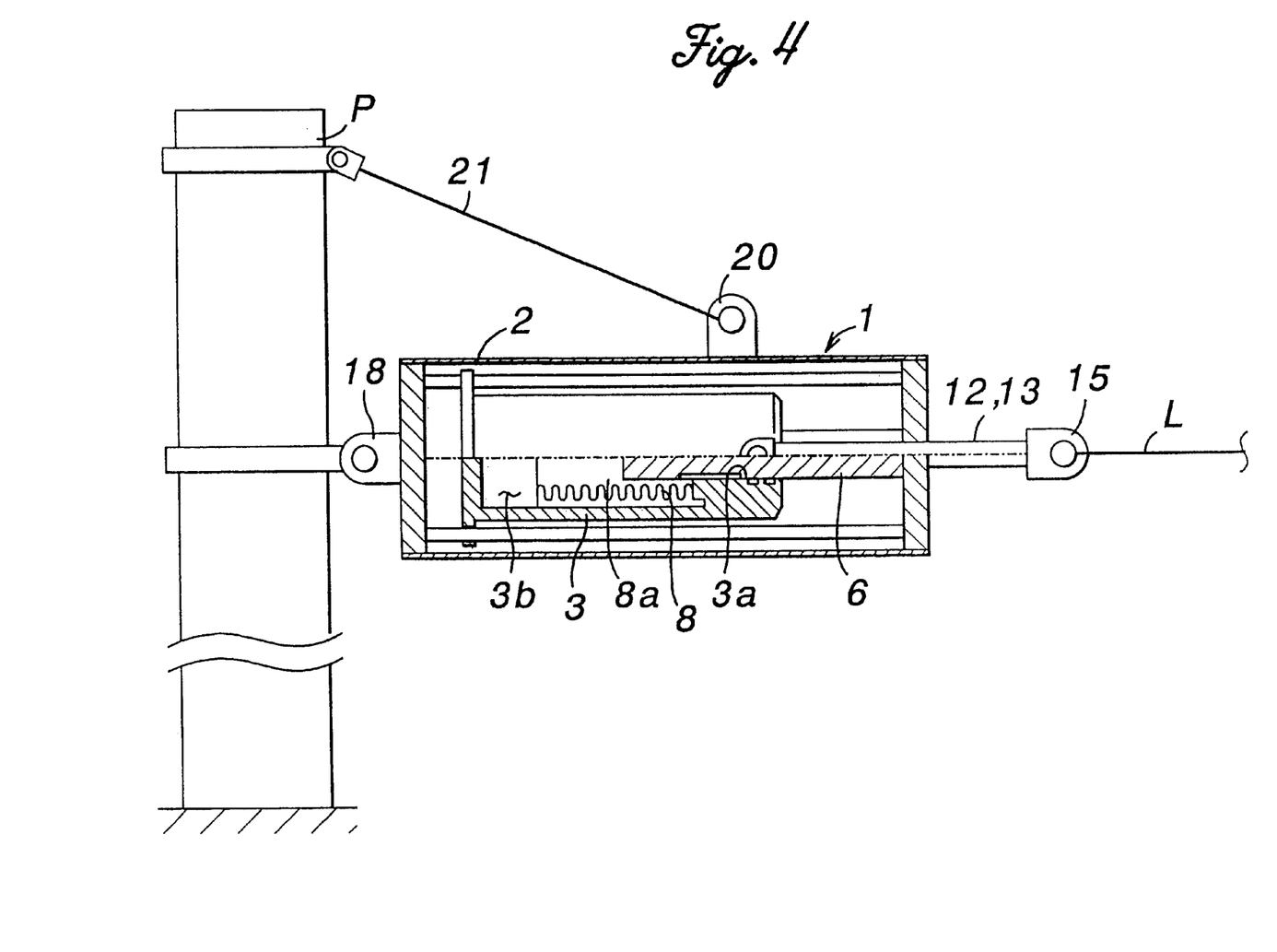
FIG. 4 is a side view of an alternate embodiment of the tensioning device according to the present invention.

FIG. 4 shows an alternate embodiment of the present invention in which a bracket 20 is attached to a side of the outer casing 2 so that the tensioning device 1 may be suspended from a pole P by using a suspension rod 21, and the direction of the movement of the cylinder case 2 may coincide with the extending direction of the overhead wire. The structure of this tensioning device 1 is otherwise similar to that of the preceding embodiment.

Figure 5:
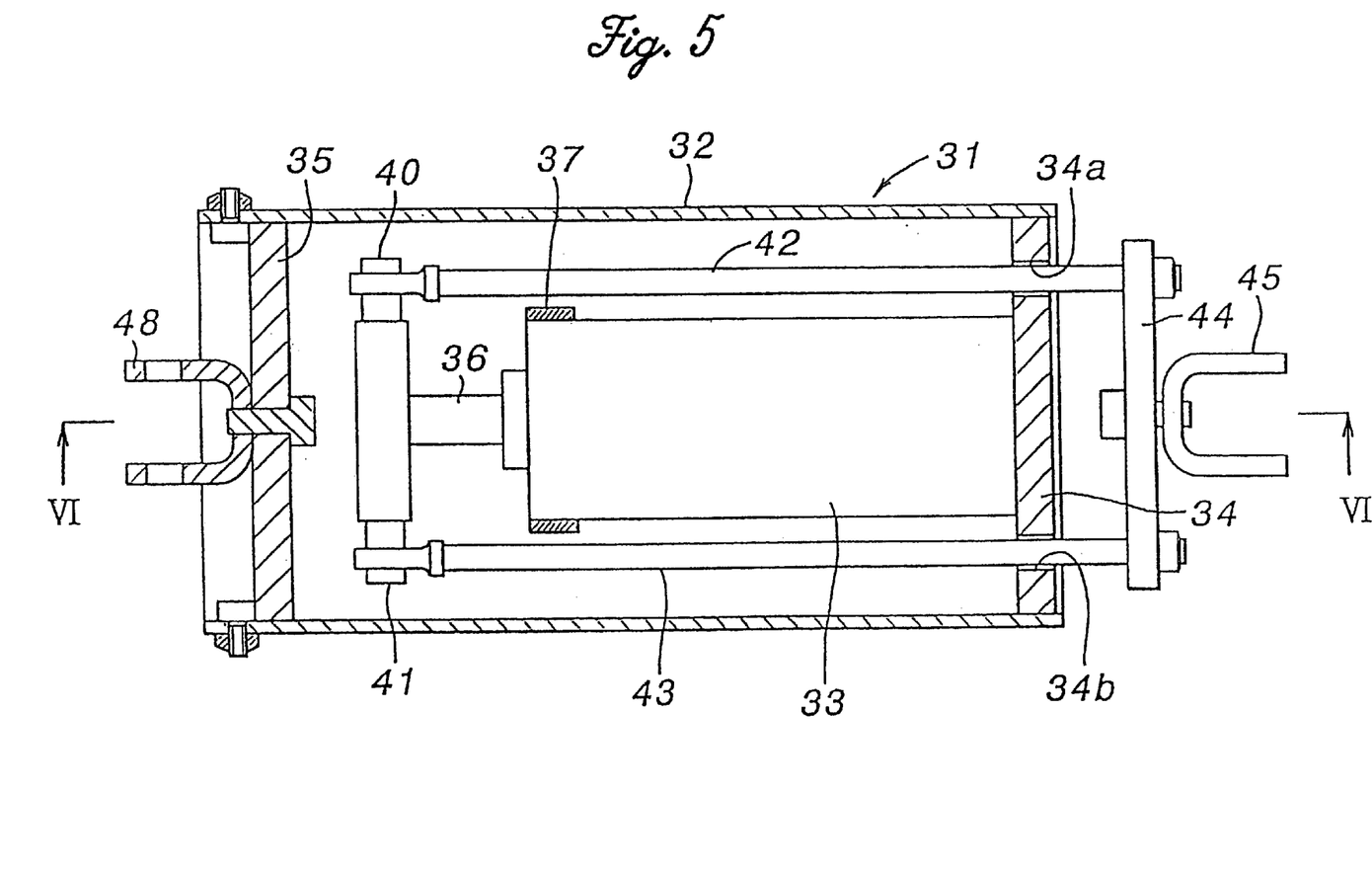
FIG. 5 is a side view of another alternate embodiment of the tensioning device according to the present invention.
Figure 6:
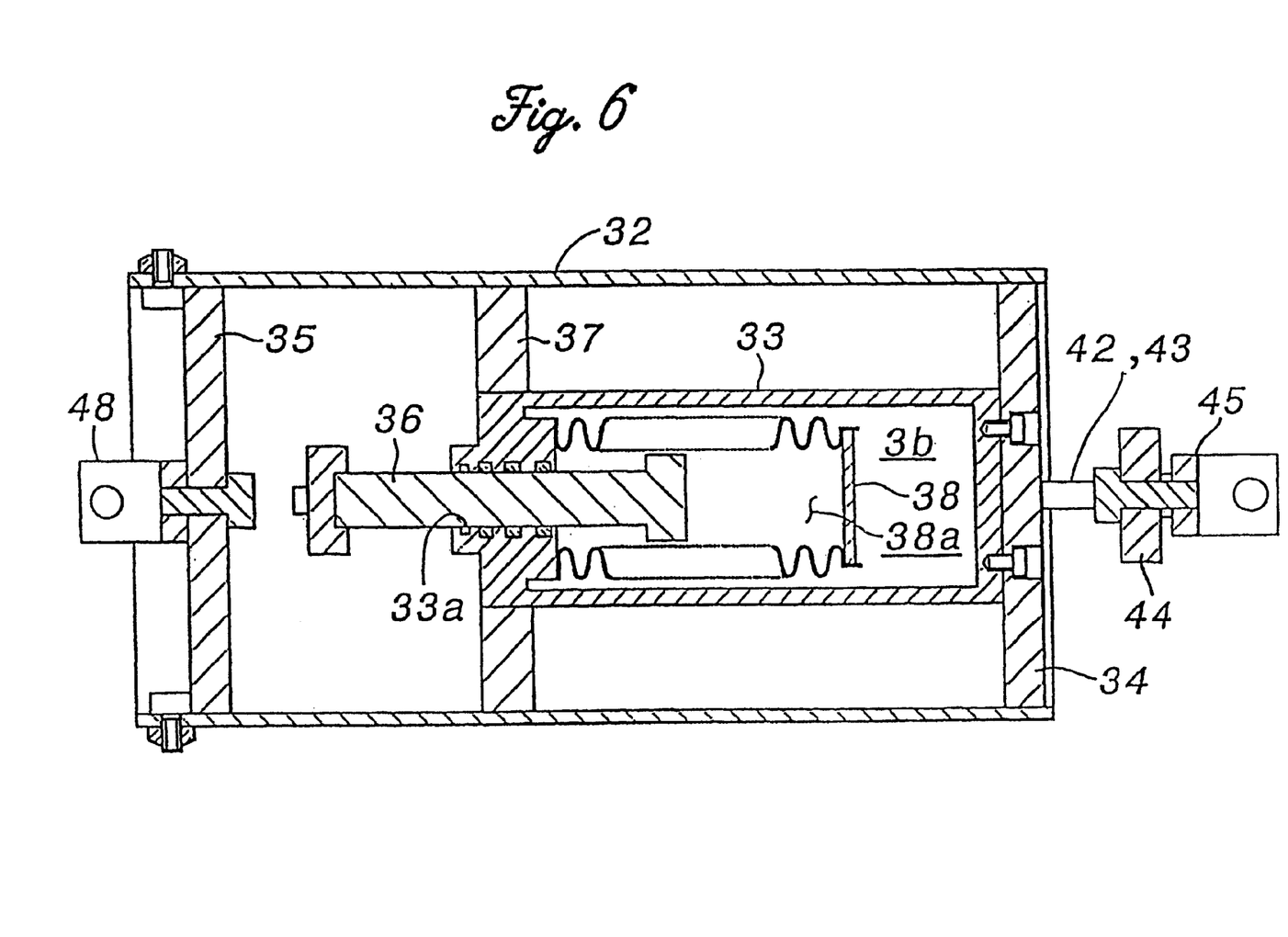
FIG. 6 is a sectional view taken along line VI—VI of FIG. 5.
Figure 7:
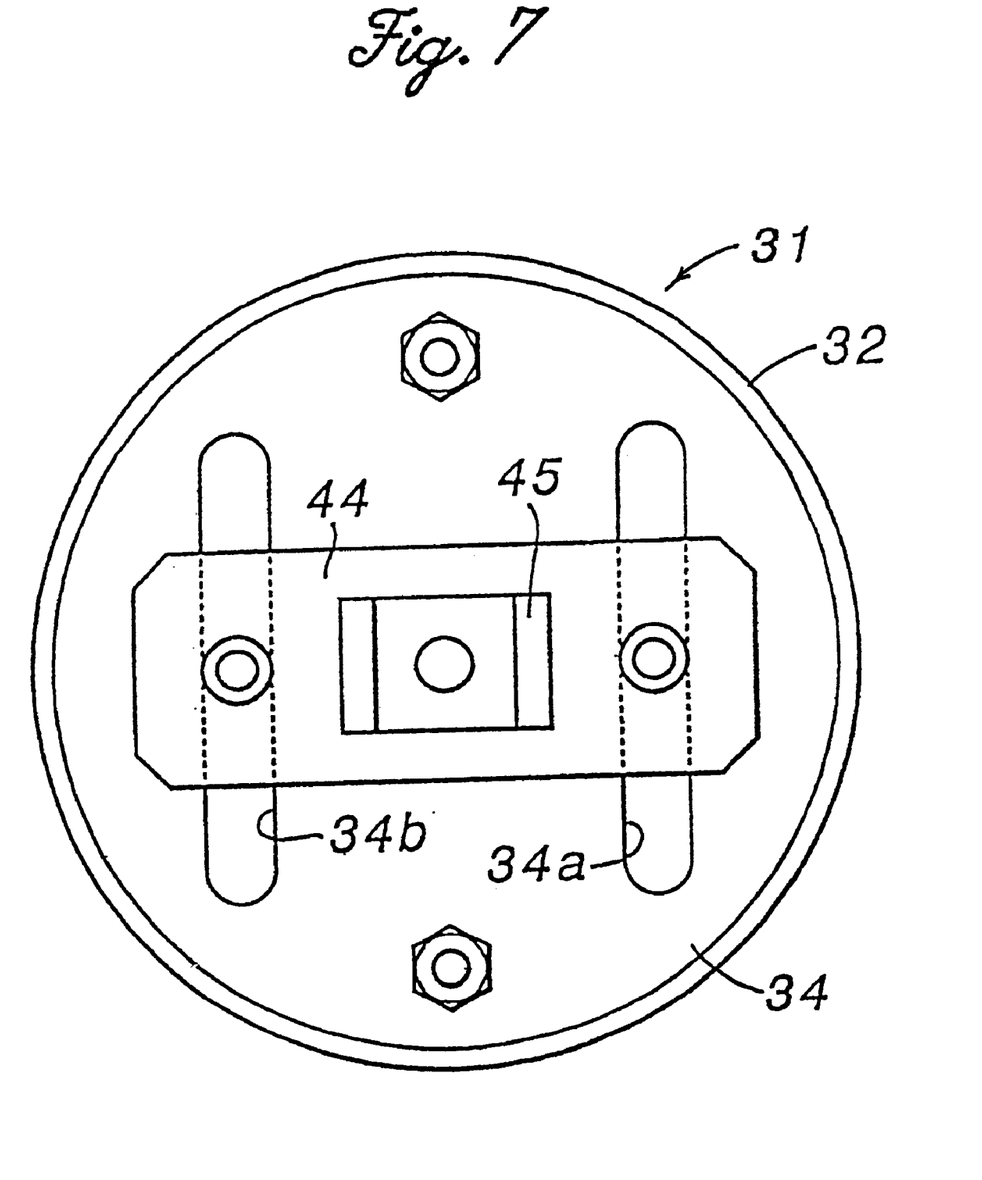
FIG. 7 is a plan view as seen from a right end of FIG. 5.

FIG. 5 is a plan view of another embodiment of the tensioning device according to the present invention, FIG. 6 is a sectional view taken along line VI—VI of FIG. 5, and FIG. 7 is a plan view as seen from a right end of FIG. 5. This tensioning device 31 comprises an outer casing 32 having a cylindrical shape with a closed bottom end, a hollow cylinder case 33 received in the outer casing 32 and having an end fixedly attached to a bottom portion 34 of the outer casing 31 on right end thereof (on the side of the overhead wire), and a cylinder rod 36 having a base end passed into the cylinder case 33 via a through hole 33a. The other end of the cylinder case 33 is supported by the outer casing 31 via a support member 37.

As shown in FIG. 6, a gas chamber 33b is defined in the cylinder case 33, and is filled with high pressure nitrogen gas. A liquid chamber 38a filled with liquid defined inside the gas chamber 33b by a bellows 38 which is fixedly attached to the left end of the cylinder case 33 at an end thereof, and capable of expanding and shrinking in the axial direction. The other end of the cylinder rod 36 is passed into this liquid chamber 38a.

As shown in FIGS. 5 and 7, slots 34a and 34b are formed in the bottom portion 34 of the outer casing 32 on the right end thereof. Trunnion shafts 40 and 41 are formed on either side of the cylinder case 33 at a left end portion thereof to pivotally support one ends of a pair of tension bars 42 and 43 serving as connecting rods. These tension bars 42 and 43 extend out of the outer casing 32 through the slots 34a and 34b in the right bottom portion thereof, and the other ends are connected to each other by a connecting plate 44. An overhead wire bracket 45 is provided in a central part of the connecting plate 44. This arrangement accommodates the difference in the extending direction of the overhead wire which is connected to the bracket 45 but not shown in the drawing. Furthermore, any swaying movement of the overhead wire can be accommodated by the pivoting movement of the tension bars 42 and 43 around the trunnion shafts 40 and 41 to the extent permitted by the slots 34a and 34b.

As shown in FIG. 6, the left bottom end portion 35 of the outer casing 32 is firmly prevented from coming off from the outer casing 32, and is centrally provided with a pole bracket 48 for the support structure.

The cylinder case 33, in particular the sliding mechanism for the cylinder rod 36, is somewhat separated from the inner wall of the outer casing 32. Therefore, even when the outer casing 2 is dented or otherwise deformed by external influences, the cylinder rod 36 can continue to function properly. The structure and operation of this embodiment are otherwise similar to those of the preceding embodiments, and are therefore not described again.

An air spring arrangement was used in the above described embodiments, but, as can be readily appreciated, may consist of other spring mechanisms such as coil springs.

What is claimed is:

1. A tensioning device for applying a prescribed tension to overhead wire, comprising:

a tubular outer casing having a first end connected to a fixed part;

a spring mechanism received in said tubular outer casing and having one end fixed to a second end of said outer casing inside said outer casing;

a tension rod having one end connected to the overhead wire, and another end received inside said outer casing and pivotally supported by the other end of the spring mechanism so as to accommodate a variable tension of the overhead wire, said one end of said tension rod extending out of an opening which is formed at said second end of said outer casing;

said outer casing being substantially enclosed except for said opening, and a swaying movement of said overhead wire being accommodated by a pivoting movement of said tension rod to an extent permitted by said opening; and wherein said first end connected to said fixed part is located at a first axial end of the tubular outer casing and said second end of the outer casing in which said opening is formed is located at a second axial end of the tubular outer casing.

2. An overhead wire tensioning device, comprising:

a tubular outer casing having a first end connected to a fixed part;

a spring mechanism received in said tubular outer casing and having one end fixed to a second end of said outer casing inside said outer casing;

a tension rod having one end connected to the overhead wire, and another end received inside said outer casing and pivotally supported by the other end of the spring mechanism so as to accommodate a variable tension of the overhead wire, said one end of said tension rod extending out of an opening which is formed at said second end of said outer casing;

said outer casing being substantially enclosed except for said opening, and a swaying movement of said overhead wire being accommodated by a pivoting movement of said tension rod to an extent permitted by said opening; and wherein said spring mechanism comprises a gas spring including a cylinder case defining a sealed gas chamber filled with high pressure gas and an oil chamber capable of expanding and shrinking so as to transmit pressure, and a cylinder rod having one end passed into the oil chamber so as to be moveable in an axial direction.

3. An overhead wire tensioning device according to claim 1, wherein a gap is defined between an inner wall of said outer casing and said spring mechanism.

4. An overhead wire tensioning device according to claim 2, wherein a gap is defined between an inner wall of said outer casing and at least one of said cylinder case and said cylinder rod.

5. An overhead wire tensioning device according to claim 1, wherein said spring mechanism comprises a cylinder case axially slidably guided inside said outer casing and pivotally connected to an inner end of said tension rod, and a piston rod extending out of an end of said cylinder case facing said second end of said outer casing and having a free end which is fixedly attached to said second end of said outer casing.

6. An overhead wire tensioning device according to claim 1, wherein said spring mechanism comprises a cylinder case having a base end fixedly attached to said second end of said outer casing inside said outer casing, and a piston rod extending out of an end of said cylinder case facing said first end of said outer casing and pivotally connected to an inner end of said tension rod.

7. An overhead wire tensioning device according to claim 1, wherein said opening comprises a slot elongated in a direction for accommodating a pivotal movement of said tension rod.

* * * * *